May 28, 1968 E. C. PRUITT ET AL 3,385,112

APPARATUS FOR CHECKING INTERNAL COMBUSTION ENGINES

Filed July 16, 1965

INVENTOR.
EARL C. PRUITT
CALVIN L. HUGHES
BY

*John H. Wilkinson*

ATTORNEY

United States Patent Office 3,385,112
Patented May 28, 1968

---

3,385,112
APPARATUS FOR CHECKING INTERNAL
COMBUSTION ENGINES
Earl C. Pruitt and Calvin L. Hughes, El Dorado, Kans.,
assignors to Wayne D. Cox, Jr.
Filed July 16, 1965, Ser. No. 472,452
4 Claims. (Cl. 73—420)

ABSTRACT OF THE DISCLOSURE

This invention relates to a new apparatus for checking engines, especially internal combustion engines, and/or the exhaust system thereof. In a more specific aspect, this invention relates to testing the condition of an engine with new apparatus to measure pressure on the exhaust system of the engine. In a still more specific aspect this invention relates to new apparatus for checking internal combustion engines by comparing relative pressure as indicated on a pressure gauge mounted on an exhaust pipe by creating a restriction therein to cause back pressure from the internal combustion engine. Additionally, this invention relates to an apparatus for checking internal combustion engines having a body means mountable upon the engine exhaust means and having a gauge means on said body means to measure the pressure within the exhaust means.

---

Many devices for checking the condition of an internal combustion engine are known to the art. These devices are complicated, expensive, often requiring trained personnel to operate them, and are usually found only in garages for the use of mechanics. There are not devices shown by the prior art which enable an unskilled person to easily and rapidly test the condition of an internal combustion engine and/or the exhaust system thereof by use of a simple inexpensive apparatus.

We have invented a new apparatus for checking engines. The apparatus has a body having an inlet and an outlet. A pressure indicating gauge is mounted in the body. The apparatus mounts on the exhaust system of the engine. The apparatus is constructed and adapted to pass exhaust gases through the body with a portion of the gases passing into the gauge, thereby indicating the pressure on the exhaust system of the engine and its condition.

Our invention is an exceedingly simple and economical apparatus particularly adapted for use by an unskilled person such as a car owner, used car salesman, filling station attendant, tail pipe and/or muffler salesman, and the like. Because of the frustro-concial shape of the body of our apparatus, it is quickly and easily mounted on the end of an exhaust pipe of most internal combustion engines. A quick indication of engine and/or exhaust system condition can be determined by setting the adjustable needle valve to a predetermined setting on the calibration provided. Since exhaust pressure of a properly functioning internal combustion engine is the same for two similar engines, the same setting on the needle valve of the invention will give the same reading on the pressure gauge where similar engines are run at the same speeds. An irregular fluctuation or a different pressure of the pressure gauge will indicate a malfunction within the engine, such as leaking valves, piston rings, and the like. A leak in the tail pipe and/or muffler is indicated by a lower than normal reading. It is readily apparent that our simple and economical apparauts is invaluable to prospective purchasers of such engines in quickly determining the general condition of an engine and/or its exhaust system.

It is an object of our invention to provide a new apparatus for checking engines, and/or the exhaust system thereof.

It is another object of our invention to provide simplified apparatus for checking the condition of engines and/or the exhaust system thereof, especially internal combustion engines.

Still another object of our invention is to provide an apparatus for checking internal combustion engines that can be used by a person unskilled in the testing of internal combustion engines.

And yet another object of our invention is to provide a new apparatus for checking the condition of internal combustion engines that is easily portable and can be used in places other than garages and the like.

Various other objects, advantages, and features of the invention will become apparent to those skilled in the art from reading this disclosure.

Drawings accompany and are a part of this disclosure. These drawings depict preferred specific embodiments of the apparatus for checking internal combustion engines of our invention, and it is to be understood that these drawings are not to unduly limit the scope of the invention. In the drawings, FIG. 1 is a side longitudinal view of a preferred specific embodiment of our invention.

Figure 1:
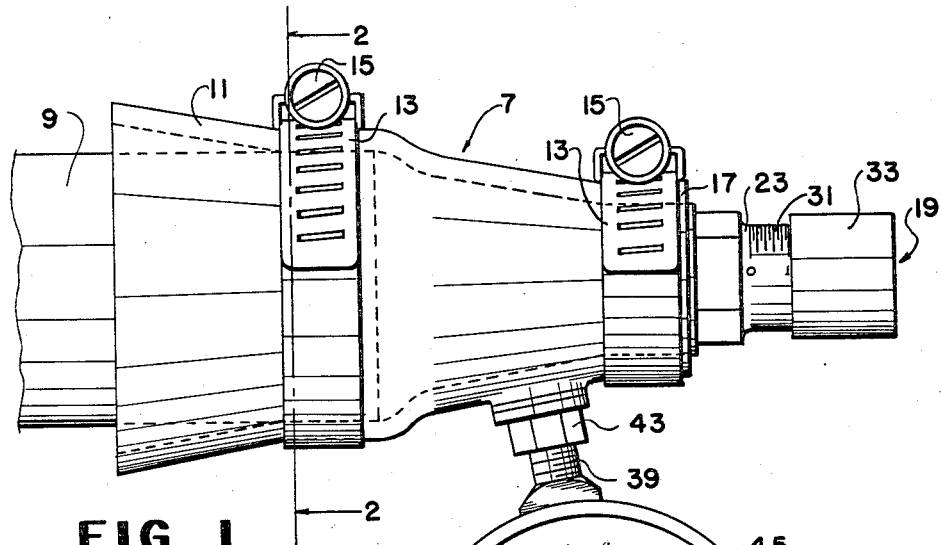
Figure 2:
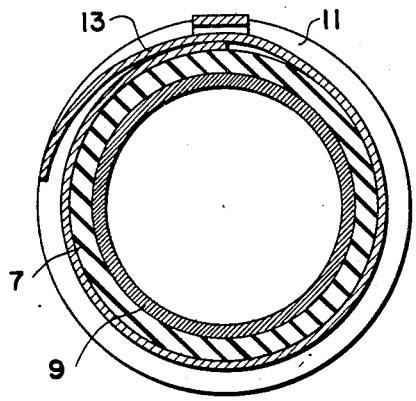
FIG. 2 is a cross section taken along line 2—2 of FIG. 1.
Figure 3:
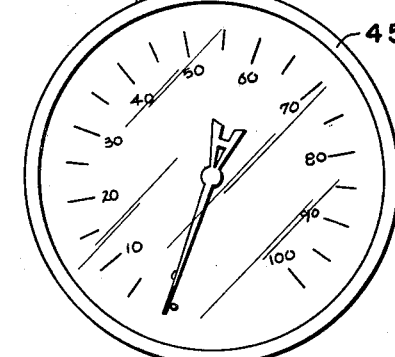
FIG. 3 is a partial longitudinal view in cross section of the preferred specific embodiment of the valve and gauge mounting of the invention.
Figure 4:
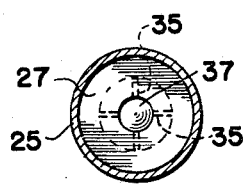
FIG. 4 is a view in cross section taken along line 4—4 of FIG. 3.

In the following is a discussion and description of the invention made with reference to the drawings whereon the same reference numerals are used to indicate the same or similar parts and/or structure. The discussion and description is of preferred specific emobdiments of the new apparatus for checking internal combustion engines of our invention, and it is to be understood that the discussion and description is not to unduly limit the scope of the invention.

Referring now to the drawings in detail, FIG. 1 shows the body of the invention 7 attached to an exhaust pipe 9 of an internal combustion engine. This body 7 is generally frusto-conical in shape and can be made of any suitable pliable heat resistant material such as plastic, rubber, rubber-like, or the like, but preferably of a fiber reinforced rubberoid material such as used on automobiles for waterhose connections. This material can be supplied by any of the many rubber goods manufacturers. The inlet portion 11 of the body 7 is preferably flared so as to be readily mountable upon varying sizes of exhaust pipes 9. The inlet portion 11 can be secured rigidly to the exhaust pipe 9 by any suitable means but preferably by a hose clamp 13. The embodiment of the hose clamp 13 as depicted on FIG. 1 is one which provides a screw means 15 mounted in opposed clamp ears for tightening the clamp and thus the inlet end 11 of body 7 around exhaust pipe 9. The clamping device 13 has proven very satisfactory in use.

The end of the body 7 having the smaller diameter is the outlet end portion 17 into which is mounted an adjustable valve assembly referred to generally at 19 by a similar but smaller clamping device 13 as hereinbefore described. A round pressure gauge aperture 21 is positioned in the body 7 between the clamps 13.

The adjustable valve assembly 19 has a hollow circular housing 23, one end portion of which is rigidly mounted in the outlet end portion 17 as hereingefore descriged. A valve seat portion 25 is immediately adjacent to the aforesaid housing end portion and has a transverse disc 27 rigidly mounted therein. This disc 27 has a hole centered on the longitudinal axis of the assembly which forms the valve seat 29. The other end portion of the housing 23 has spaced calibration marks 31 scribed therein. These scribed marks 31 are preferably circumferential and in longitudinal spaced relationship.

A valve sleeve 33 is threadedly mounted on the projecting end portion of the housing 23. Two diametrical valve support members 35 are mounted on the outside end portion of the valve sleeve 33 in perpendicular relationship. These members must be sufficiently strong to support a needle valve 37 rigidly mounted on the intersecting center point, but sufficiently narrow to allow exhaust gases to escape around the members 35. The needle valve 37 is in the shape of a cone on its projecting end portion and of sufficient length so as to project into the valve seat 29. The valve 37 preferably engages the valve seat 29 when the valve sleeve 33 has been rotated on the threads provided so that the inside end portion of the sleeve is coincident with the zero marking of the calibrations 31. A gauge tube 39 is mounted in and through the aperture 21. A mounting disc 41 is rigidly mounted on the inwardly projecting end portion of the gauge tube 39 and of such size so as to engage an inside portion of the body 7 immediately adjacent to the aperture 21. A threaded mounting nut is threadedly mounted on the tube 39 and engages an outside portion of the body 7 immediately adjacent to the aperture 21, thus rigidly mounting the gauge tube 39 in the body 7. This, of course, is merely a preferred specific means of mounting the gauge tube in the body 7 and it is apparent to those skilled in the art that other means can well be used such as vulcanizing, riveting, or the like. A pressure gauge 45 is preferably threadedly mounted on the projecting end portion of the gauge tube 39 and in close sealing engagement therewith. This pressure gauge can be of any type well known to the art for recording fluid pressures in pounds by means of a movable dial on a graduated face. However, any type of easily and readily readable pressure recording device can be used. If desired, the gauge can be calibrated to read normal and below normal and for a particular make of car, if also desirable.

In the operation of our invention the flared or conical shaped end portion 11 of the body 7 is mounted on and around the projecting end portion of an exhaust pipe 9 of an internal combustion engine such as on an automobile, tractor, or the like. The slidably adjustable clamp 13 is positioned to rigidly mount the body 7 on the exhaust pipe 9 by means of the screw arrangement 15. The needle valve assembly 19 should be in an open position when the engine is started. After the engine is running the needle valve 37 can be closed to a predetermined point, according to the make of automobile, tractor, etc., whereupon back pressure is built up within the body 7 from the exhaust gases passing from the exhaust pipe 9 and causing the gauge 45 to be actuated to record the back pressure in pounds, or other suitable measure. The optimum exhaust pressure of a properly functioning internal combustion engine is a known and constant factor. This invention provides a relative exhaust pressure reading which can be accurately controlled by the calibrated adjustments on the needle valve assembly. A chart can be provided to serve as a means of easy reference to the operator of our invention showing the calibration settings and pressure gauge readings for various types of engines. A malfunction of one or more of the valve and cylinder assemblies can be easily detected by fluctuations in pressure as recorded by the gauge 45. If the pressure is below normal in a proper functioning engine in good mechanical condition, a worn and leaking exhaust system is indicated. A new muffler and/or tail pipe can then most likely cure the dangerous condition.

The preferred specific embodiment of our invention having the adjustable needle valve should not be construed as being restrictive to this arrangement only. A fixed predetermined outlet aperture can be utilized for each of various engines having different normal exhaust system pressures.

The materials used in the fabrication of our invention except as hereinbefore noted are those well known to the art such as metal or plastic, but preferably of metal. The gauge, of course, is a combination of materials well known to the art for such devices.

The foregoing discussion and description has been made in connection with preferred specific embodiments of the new apparatus for checking internal combustion engines of our invention, and it is to be understood that the discussion and description is only intended to illustrate and teach those skilled in the art how to practice the invention, and such is not to unduly limit the scope of the invention, which is defined in the claims set forth hereinafter.

We claim:

1. A new apparatus for checking internal combustion engines comprising, a hollow frustro-conical shaped body having a flared inlet end portion in the end thereof having the larger diameter, an outlet end portion in the other end thereof, a gauge aperture therein spaced between said end portions, a circular needle valve assembly mounted in the said outlet end portion in close fitting engagement with the interior of said outlet end portion, said needle valve assembly having a hollow circular housing, said housing having an end portion mounted in the said outlet end portion of said body in close fitting engagement, a valve seat portion immediately adjacent to said housing end portion, said valve seat portion having a transverse disc mounted therein forming a valve seat, said valve seat having a hole centered therein, the other end portion of said housing having spaced calibration marks circumferentially scribed thereon in longitudinal relation, and threads on the outside of the outer end portion thereof, a valve sleeve threadedly mounted on said outer end portion of said housing, said valve sleeve having two diametrical intersecting valve support members mounted in the outer end portion thereof, a conical valve rigidly and axially mounted on the intersecting center point of said support members, said valve adjustably projecting through said calibrated end portion and said valve seat, and engageable with said valve seat, a gauge tube engageably mounted in and through said gauge aperture, a mounting disc rigidly mounted on the inwardly projecting end portion of said tube, said mounting disc having a diameter greater than the diameter of said aperture, and engaging an inside portion of said body, a threaded mounting nut threadedly mounted on said tube and engaging the outside portion of said body, said mounting disc and mounting nut rigidly mounting said tube in said aperture, a pressure gauge threadedly mounted on the other end portion of said tube in pressure measuring and indicating communication with the inside of said hollow body, circular clamp means around said outlet end portion of said body securing said valve assembly in said outlet end portion of said body, adjustable clamp means slidably mounted around the inlet end portion of said body, said adjustable clamp means constructed and adapted to rigidly mount said inlet portion of said body on the projecting end portion of an exhaust pipe of an internal combustion engine, said apparatus constructed and adapted to pass exhaust gases into said body from said exhaust pipe into and through said valve assembly housing and valve seat, around said valve and out through said valve sleeve, a portion of said gases passing into said gauge tube and into said gauge, thereby measuring the pressure within the exhaust system of said engine.

2. A new apparatus for checking internal combustion engines comprising, a hollow frustro-conical shaped body having a flared inlet end portion, an outlet end portion, a gauge aperture spaced between said end portions, a circular calibrated needle valve assembly rigidly mounted in the said outlet end portion, a gauge tube engageably and rigidly mounted in said gauge aperture, a pressure gauge threadedly mounted on the outwardly projecting end portion of said tube in pressure measuring communication with the inside of said body, said inlet portion of said body rigidly and removably mounted on the projecting end portion of an exhaust pipe by adjustable clamp means, said apparatus constructed and adapted to pass exhaust gases into said body from said exhaust pipe into, through and out of said valve assembly, a portion of said gases passing into and through said gauge tube and into said gauge, thereby measuring the pressure within said exhaust pipe.

3. A new apparatus for checking internal combustion engines comprising a hollow frusto-conical shaped body having a flared inlet end portion, an outlet end portion, adjustable valve means mounted in said outlet end portion, gauge means mounted on said body means in pressure measuring relationship to the inside of said body, and said inlet end portion of said body means rigidly and releasably mounted on engine exhaust means by adjustable clamp means, said apparatus constructed and adapted to pass exhaust gases into said body from said exhaust means into, through and out of said valve means, a portion of said gases passing into said gauge means thereby measuring the pressure within said exhaust means.

4. A new apparatus for checking internal combustion engines comprising a body means having a flared inlet end portion, an outlet end portion, adjustable valve means mounted in said outlet end portion of said body, gauge means mounted on said body means in pressure measuring relationship to the inside of said body, and said inlet end portion of said body means rigidly and releasably mounted on engine exhaust means by adjustable clamp means, said apparatus constructed and adapted to pass said exhaust gases into said body from said exhaust means into, through and out of said valve means, a portion of said gases passing into said gauge means, thereby measuring the pressure within said exhaust means.

References Cited
UNITED STATES PATENTS

| | | | |
|---|---|---|---|
| 1,028,142 | 6/1912 | Seaman | 285—8 X |
| 1,473,537 | 11/1923 | Bailey | 285—8 |
| 1,602,136 | 10/1926 | Walker | 73—211 |
| 1,729,732 | 10/1929 | Wasson | 73—116 X |
| 2,211,196 | 8/1940 | Bristow | 73—116 |
| 2,675,020 | 4/1954 | Breitwieser | 73—211 X |
| 2,754,138 | 7/1956 | Kramer | 285—236 X |
| 2,858,697 | 11/1958 | Entwistle | 73—118 X |

RICHARD C. QUEISSER, *Primary Examiner.*

JAMES J. GILL, *Examiner.*

J. W. MYRACLE, *Assistant Examiner.*